(12) United States Patent
Miyairi et al.

(10) Patent No.: US 11,268,422 B2
(45) Date of Patent: Mar. 8, 2022

(54) EXHAUST GAS MIXING APPARATUS, EXHAUST GAS PURIFIER AND EXHAUST GAS PURIFICATION METHOD

(71) Applicant: NGK INSULATORS, LTD., Nagoya (JP)

(72) Inventors: Yukio Miyairi, Nagoya (JP); Masaaki Masuda, Nagoya (JP); Shinzo Hayashi, Nagoya (JP); Yoshifumi Takagi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 99 days.

(21) Appl. No.: 16/878,896

(22) Filed: May 20, 2020

(65) Prior Publication Data

US 2020/0378292 A1 Dec. 3, 2020

(30) Foreign Application Priority Data

May 30, 2019 (JP) .............................. JP2019-100989
Jan. 22, 2020 (JP) .............................. JP2020-008536

(51) Int. Cl.
*F01N 3/28* (2006.01)
*F01N 3/20* (2006.01)
(Continued)

(52) U.S. Cl.
CPC ....... *F01N 3/2892* (2013.01); *B01D 53/9418* (2013.01); *B01F 5/04* (2013.01);
(Continued)

(58) Field of Classification Search
CPC .... F01N 3/2013; F01N 3/2066; F01N 3/2892; F01N 9/00; F01N 2240/20; F01N 2330/06; F01N 2510/02; F01N 2610/02; F01N 2610/1453; F01N 2900/0602; B01F 5/04; B01F 5/0614; B01F 5/0618; B01F 15/066; B01F 2015/062; B01D 53/9418
(Continued)

(56) References Cited

U.S. PATENT DOCUMENTS 7,712,305 B2 * 5/2010 Kapsos ............... B01F 3/04049
60/286
10,113,468 B2 * 10/2018 Middleton, Jr. ...... B01F 5/0616
(Continued)

FOREIGN PATENT DOCUMENTS

CN 207686805 U 8/2018
JP 2007-327377 A1 12/2007
(Continued)

OTHER PUBLICATIONS

Heike Tobben et al., "Urea Processing—A Keyfactor in EATS Development", 27th Aachen Colloquium Automobile and Engine Technology 2018, pp. 219-238.
Chinese Office Action (Application No. 202010422655.3) dated Oct. 11, 2021 (with English translation).

*Primary Examiner* — Audrey B. Walter
(74) *Attorney, Agent, or Firm* — Burr & Brown, PLLC

(57) ABSTRACT

A exhaust gas mixing apparatus includes an outer cylinder being configured to an insulating ceramic; fins being configured to an insulating ceramic, the fins being provided on an inner side of the outer cylinder; and an electric heating portion embedded in at least a part of the outer cylinder and/or the fins.

24 Claims, 11 Drawing Sheets

1A

(51) Int. Cl.
   *F01N 9/00*    (2006.01)
   *B01F 5/06*    (2006.01)
   *B01F 15/06*   (2006.01)
   *B01F 5/04*    (2006.01)
   *B01D 53/94*   (2006.01)

(52) U.S. Cl.
   CPC .......... *B01F 5/0614* (2013.01); *B01F 5/0618* (2013.01); *B01F 15/066* (2013.01); *F01N 3/2013* (2013.01); *F01N 3/2066* (2013.01); *F01N 9/00* (2013.01); *B01F 2015/062* (2013.01); *F01N 2240/20* (2013.01); *F01N 2330/06* (2013.01); *F01N 2510/02* (2013.01); *F01N 2610/02* (2013.01); *F01N 2610/1453* (2013.01); *F01N 2900/0602* (2013.01)

(58) Field of Classification Search
   USPC .......................................................... 60/324
   See application file for complete search history.

(56) References Cited

U.S. PATENT DOCUMENTS

| | | |
|---|---|---|
| 2014/0047821 A1 | 2/2014 | Kawada et al. |
| 2015/0016214 A1* | 1/2015 | Mueller ................. F01N 3/206 366/337 |
| 2015/0315943 A1 | 11/2015 | Gschwind |
| 2018/0058294 A1* | 3/2018 | Zhang .................... F01N 13/08 |
| 2019/0030498 A1* | 1/2019 | Kariya .................. B01F 5/0057 |
| 2019/0388848 A1* | 12/2019 | Kurpejovic ........... B01F 15/066 |

FOREIGN PATENT DOCUMENTS

| | | |
|---|---|---|
| JP | 2012-197695 A1 | 10/2012 |
| JP | 2019-007449 A1 | 1/2019 |
| WO | 2014/086440 A1 | 6/2014 |
| WO | 2017/198292 A1 | 1/2017 |

* cited by examiner

1A

1A

1B

1B

Exhaust Gas

Example 2  Example 3

EXHAUST GAS MIXING APPARATUS, EXHAUST GAS PURIFIER AND EXHAUST GAS PURIFICATION METHOD

FIELD OF THE INVENTION

The present invention relates to an exhaust gas mixing apparatus, an exhaust gas purifier, and a method for purifying an exhaust gas.

BACKGROUND OF THE INVENTION

There is an increasing need for reduction of harmful components (HC, NOx, CO) in an automobile exhaust gas. In particular, purification of NOx emitted from diesel engines is an important issue.

A technique called a urea-SCR system is generally known as a method for purifying NOx (e.g., Patent Literature 1).

In order to obtain $NH_3$ that will be a NOx reducing agent from urea efficiently, pyrolysis and hydrolysis of urea is required, and an atmosphere must be controlled to 200° C. or more.

Therefore, Patent Literature 2 discloses that urea is subjected to pyrolysis and hydrolysis by heating a carrier gas for use in granulation of urea (aqueous urea) with a carrier gas heating portion, as well as by inserting a glow plug into a catalyst portion to conduct a current to heat it.

However, this is based on the use of the carrier gas to atomize the urea, and does not inject the urea directly into the exhaust gas.

Here, the pyrolysis and hydrolysis of urea is represented by the following reaction formulae:

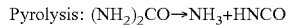

Pyrolysis: $(NH_2)_2CO \rightarrow NH_3 + HNCO$

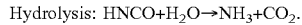

Hydrolysis: $HNCO + H_2O \rightarrow NH_3 + CO_2$.

Further, in order to advance the two-step reaction of urea (pyrolysis and hydrolysis) efficiently and rapidly and to disperse the produced $NH_3$ in the exhaust gas uniformly, various mixing apparatuses are proposed in Non-Patented Literature 1.

On the other hand, a temperature of an exhaust gas has been lowered with improvement of an engine efficiency. Further, the temperature of the exhaust gas is lower even immediately after starting the engine. When the temperature of the exhaust gas is lower, $NH_3$ is not sufficiently produced because the decomposition reaction is difficult to occur even if urea is injected into the exhaust gas.

Therefore, Patent Literature 3 proposes a mixing apparatus (dispersing device) including: a circular ring-shaped frame portion having an outer diameter equal to an inner diameter of an exhaust passage; an electric heating wire disposed on a surface on a downstream side of the frame portion so as to surround the frame portion; and a plurality of fins formed on a radially inner side of the frame portion. It also discloses that when the temperature of the exhaust gas is lower, the mixing apparatus can advance the decomposition reaction of urea by conducting a current through the electric heating wire to heat it.

CITATION LIST

Patent Literatures

[Patent Literature 1] Japanese Patent Application Publication No. 2007-327377 A
[Patent Literature 2] Japanese Patent Application Publication No. 2012-197695 A
[Patent Literature 3] Japanese Patent Application Publication No. 2019-7449 A

Non-Patent Literature

[Non-Patent Literature] Heike Tobben et al., "Urea Processing—A Keyfactor in EATS Development", 27th Aachen Colloquium Automobile and Engine Technology 2018, p. 219-238

SUMMARY OF THE INVENTION

The present invention relates to an exhaust gas mixing apparatus, the mixing apparatus comprising: an outer cylinder being configured to an insulating ceramic; fins being configured to an insulating ceramic, the fins being provided on an inner side of the outer cylinder; and an electric heating portion embedded in at least a part of the outer cylinder and/or the fins.

The present invention also relates to an exhaust gas purifier, comprising: an exhaust cylinder through which an exhaust gas can flow; at least one exhaust gas mixing apparatus as described above, the mixing apparatus being disposed within the exhaust cylinder; and a compressive elastic member provided between the exhaust cylinder and the at least one exhaust gas mixing apparatus.

Further, present invention relates to an exhaust gas purification method using the exhaust gas purifier, comprising the steps of: injecting urea to the fins while conducting no current through the electric heating portion of the mixing apparatus for the exhaust gas purifier when a temperature of an exhaust gas is higher than or equal to a predetermined value; and injecting the urea to the fins while conducting a current through the electric heating portion when the temperature of the exhaust gas is lower than the predetermined value.

DETAILED DESCRIPTION OF THE INVENTION

Although Patent Literature 3 does not specifically describe materials of the frame portion and the fins that form the mixing apparatus, the mixing apparatus having such a structure is generally configured to a metal. According to findings of the present inventors, the metal frame portion and the fins have a large heat capacity, so that the heating of the frame portion and the fins using the electric heating wire requires time and is not efficient, as well as power consumption is increased. Further, the electric heating wire installed in the mixing apparatus is exposed to the surface of the frame portion, so that the electric heating wire may be rusted when urea adheres to it.

The present invention is made by solving the above problems. An object of the present invention is to provide an exhaust gas mixing apparatus that is rust-resistant and can be efficiently heated with a decreased amount of electricity.

Further, an object of the present invention is to provide an exhaust gas purifier and an exhaust gas purification method that can obtain a good NOx purification performance over a long period of time with a decreased amount of electricity, even if the temperature of the exhaust gas is lower.

As a result of intensive studies, the present inventors have found that all of the above problems can be solved by using insulating ceramics with a smaller heat capacity to form a member that configures a mixing apparatus and embedding an electric heating element in the member, and they have completed the present invention.

According to the present invention, it is possible to provide an exhaust gas mixing apparatus that is rust-resistant and can be efficiently heated with a decreased amount of electricity.

Further, according to the present invention, it is possible to provide an exhaust gas purifier and an exhaust gas purification method that can obtain a good NOx purification performance over a long period of time with a decreased amount of electricity, even if the temperature of the exhaust gas is lower.

Hereinafter, specific embodiments of the present invention will be described in detail with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention.

(Exhaust Gas Mixing Apparatus)

Figure 1:
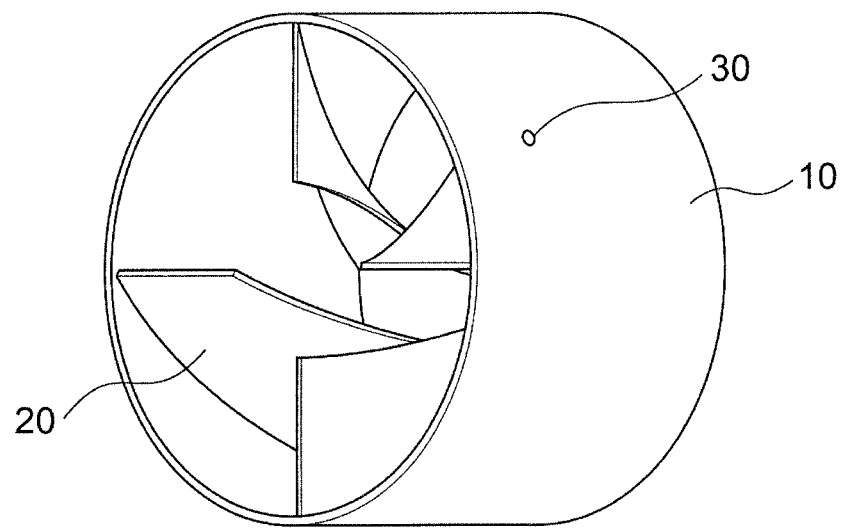
FIG. 1 is a perspective view of an exhaust gas mixing apparatus according to an embodiment of the present invention.
Figure 2:
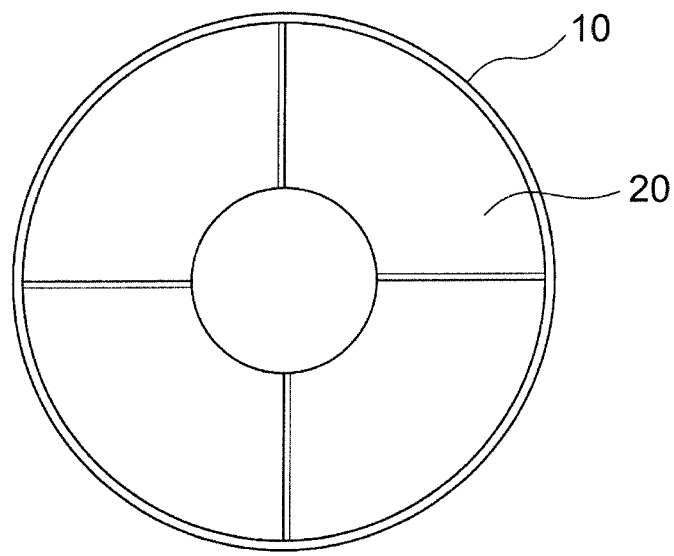
FIG. 2 is a front view of an exhaust gas mixing apparatus according to an embodiment of the present invention, as viewed from an exhaust gas inflow side.

FIG. 1 is a perspective view of an exhaust gas mixing apparatus according to an embodiment of the present invention, and FIG. 2 is a front view of the exhaust gas mixing apparatus as viewed from an exhaust gas inflow side.

Figure 3:
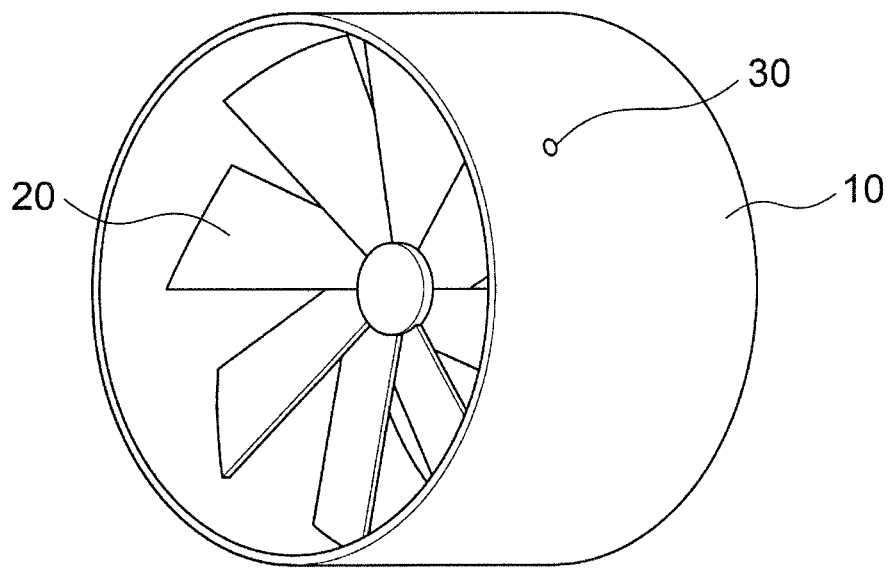
FIG. 3 is a perspective view of an exhaust gas mixing apparatus according to other embodiment of the present invention.
Figure 4:
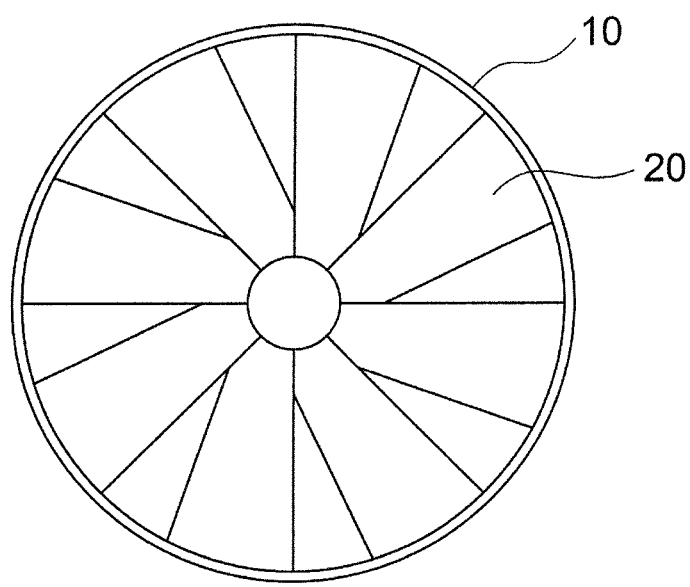
FIG. 4 is a front view of an exhaust gas mixing apparatus according to other embodiment of the present invention, as viewed from an exhaust gas inflow side.

Further, FIG. 3 is a perspective view of an exhaust gas mixing apparatus according to other embodiment of the present invention, and FIG. 4 is a front view of the exhaust gas mixing apparatus as viewed from an exhaust gas inflow side.

As shown in FIGS. 1 to 4, exhaust gas mixing apparatuses (hereinafter referred to as a "mixing apparatus") 1A, 1B each includes an outer cylinder 10; fins 20; and an electric heating portion 30.

The outer cylinder 10 is configured to insulating ceramic. Such a configuration can prevent any leakage from the outer cylinder 10.

As used herein, the term "insulating ceramic" refers to a ceramic having a volume resistivity of $10^{12}$ Ω·m or more at room temperature (25° C.), preferably $10^{14}$ Ω·m or more.

The insulating ceramic is not particularly limited, and those known in the art can be used. Examples of the insulating ceramic includes alumina, magnesium oxide, aluminum nitride, silicon nitride, cordierite, mullite, yttria, zirconia, silicon carbide, magnesia alumina spinel, steatite, forsterite, and the like. Among these, cordierite, silicon nitride, and alumina are preferable. They may be used alone or in combination with two or more.

The insulating ceramic is preferably dense. This can make it difficult for urea to penetrate into the interior when the ceramic is brought into contact with the injected urea.

As used herein, the term "dense" refers to an open porosity of 5% or less. The open porosity of 5% or less can sufficiently prevent aqueous urea from penetrating into the ceramic from the surface to generate short-circuits. The open porosity of the insulating ceramic can be measured using an existing test method (Archimedes method, JIS R 1634: 1998).

Non-limiting examples of a method for making the insulating ceramic dense that can be used include reduction of a particle diameter of ceramic raw powder or addition of a sintering aid.

The insulating ceramic has a heat capacity of preferably 4.5 J/cm$^3$K or less, and more preferably 3.0 J/cm$^3$K or less, and more preferably 2.5 J/cm$^3$K or less, although not particularly limited thereto. By controlling the heat capacity within such a range, the outer cylinder 10 can be efficiently heated by conducting a current through the electric heating portion 30 embedded in the outer cylinder 10 and/or the fins 20. The heat capacity of the insulating ceramic is preferably 0.1 J/cm$^3$K or more, and more preferably 0.5 J/cm$^3$K or more, in view of increasing thermal fluctuation.

For example, the heat capacity of dense cordierite is 1.5 J/cm$^3$K, the heat capacity of silicon nitride is 2.2 J/cm$^3$K, the heat capacity of alumina is 3.1 J/cm$^3$K, and the heat capacity of zirconia is 2.9 J/cm$^3$K.

The heat capacity of the insulating ceramic can be calculated as follows. The heat capacity (J/gK) of the insulating ceramic per unit mass at 600° C. is measured using a heat insulation type specific heat measuring device from ULVAC. The heat capacity (J/gK) per unit mass may be measured by the laser flash method in accordance with JIS R 1611: 2010. A heat capacity (J/cm$^3$K) per unit volume of the insulating ceramic is calculated by multiplying the resulting heat capacity per unit mass (J/gK) by true density (g/cm$^3$) of the insulating ceramic measured by the Archimedean method at room temperature.

The insulating ceramic has a thermal conductivity of preferably 30 W/mK or more, and more preferably 50 W/mK or more, although not particularly limited thereto. By controlling the thermal conductivity to such a range, the entire outer cylinder 10 can be efficiently heated. The thermal conductivity of the insulating ceramic is preferably 300 W/mK or less, in terms of increasing the heating efficiency and avoiding significant heat dissipation.

For example, the thermal conductivity of dense corderite is 4 W/mK, the thermal conductivity of silicon nitride is from 60 to 90 W/mK, the thermal conductivity of alumina is from 30 to 35 W/mK, and the thermal conductivity of zirconia is 3 W/mK.

The thermal conductivity of the insulating ceramic can be measured by the laser flash method (JIS R 1611: 210).

The insulating ceramic has a thermal expansion coefficient of preferably 4 ppm/K or less. This can allow a thermal stress during rapid cooling in contact with the injected urea to be decreased, thereby increasing reliability of the mixing apparatus 1A, 1B. Further, the thermal expansion coefficient of the insulating ceramic is preferably 1 ppm/K or more, in terms of suppressing any damage of the outer cylinder 10 and/or the fins 20 due to a difference between the thermal expansions of the embedded electric heating portion 30 and the insulating ceramic.

For example, the thermal expansion coefficient of dense cordierite is 1.6 ppm/K, the thermal expansion coefficient of silicon nitride is from 3.0 to 3.2 ppm/K, the thermal expansion coefficient of alumina is from 7.5 to 8.5 ppm/K, and the thermal expansion coefficient of zirconia is from 10 to 11 ppm/K.

The thermal expansion coefficient of the insulating ceramic can be measured in accordance with JIS R 1618: 2000.

The insulating ceramic has a Young's modulus of preferably 300 GPa or less, although not particularly limited thereto. This can allow the thermal stress during rapid cooling in contact with the injected urea to be decreased, thereby increasing the reliability of the mixing apparatus 1A, 1B. The Young's modulus of the insulating ceramic is preferably 100 GPa or more, in terms of suppressing deformation and destruction caused by vibrations in an in-vehicle environment.

For example, the Young's modulus of dense cordierite is 150 GPa, the Young's modulus of silicon nitride is 280 GPa, the Young's modulus of alumina is 350 GPa, and the Young's modulus of zirconia is 200 GPa.

The Young's modulus of the insulating ceramic can be calculated as follows. A bending strength of the insulating ceramic is measured in accordance with the four-point bending strength test method defined in JIS R 601:2008, and creating a "stress-strain curve" from the measurement results. A slope of the "stress-strain curve" thus obtained is calculated, and the slope of the "stress-strain curve" is determined to be the Young's modulus.

The fins 20 are provided on an inner side of the outer cylinder 10. The fins 20 have functions of colliding with the injected urea and dispersing the urea to the surroundings and also generating a swirling flow in the exhaust gas passing between the fins 20. Further, the fins 20 also have a function of allowing the decomposition reaction of urea to proceed to produce NH$_3$ when the temperature of the exhaust gas is lower. Such functions can accelerate the dispersion of urea or NH$_3$ in the exhaust gas.

The fins 20 are formed from the insulating ceramic, as with the outer cylinder 10. This can prevent any electrical leakage from the fins 20.

The insulating ceramic used for the fins 20 may be the same material as or a different material from the insulating ceramic used for the outer cylinder 10, but from the viewpoint of productivity, it is preferable that the fins 20 are configured to the same material.

The shape of each fin 20 is not particularly limited and may be any shape known in the art. For example, each fin 20 may be flat or curved, but it is preferable that each fin 20 has an inclined angle in the flow direction of the urea injected into the mixing apparatus 1A, 1B. Such a configuration allows the urea injected into the mixing apparatus 1A, 1B to contact the fins 20 stably.

The entire structure of the fins 20 is not particularly limited and may be various structures known in the art. For example, the structure may have four spiral fins 20 provided around a central axis of the outer cylinder 10 as shown in FIGS. 1 and 2. Also, as shown in FIGS. 3 and 4, the structure may be a combination of a disk-shaped fin 20 provided on the central axis of the outer cylinder 10 and plate-shaped fins 20 radially provided around the disk-shaped fin 20. In the latter structure, each plate-shaped fin 20 is arranged in an inclined state at a fixed angle with respect to a plane orthogonal to the central axis of the outer cylinder 10.

Although the outer cylinder 10 and each fin 20 may be separately prepared and then joined together using an adhesive or the like, it is preferable that they are integrally molded. The integral molding of the outer cylinder 10 with the fins 20 not only increases a bonding strength of the fins 20 to the outer cylinder 10, but also improves the flow of heat and the productivity of the fins 20.

The electric heating portion 30 is embedded in at least a part of the outer cylinder 10 and/or the fins 20.

Figure 5:
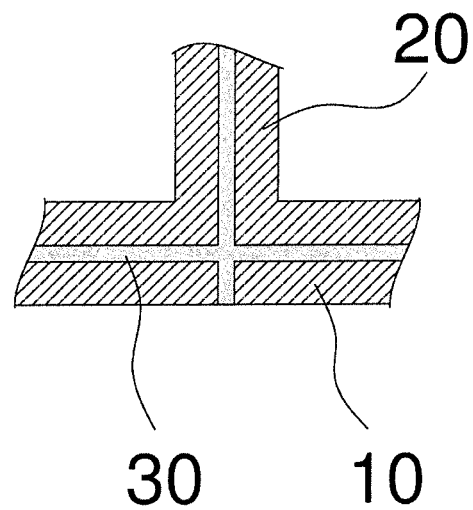
FIG. 5 is a partially enlarged cross-sectional view of the vicinity of an electric heating portion exposed to an outer cylinder in the exhaust gas mixing apparatus as shown in FIGS. 1 to 4.

Here, FIG. 5 shows an enlarged cross-sectional view of an area around the electric heating portion 30 exposed to the outer cylinder 10 in the mixing apparatus 1A, 1B. In FIG. 5, the electric heating portion 30 is embedded in at least a part of the outer cylinder 10 and the fin 20. By thus embedding the electric heating portion 30, the electric heating portion 30 does not come into contact with the urea, so that rusting of the electric heating portion 30 can be suppressed. Moreover, the outer cylinder 10 and the fins 2Q are formed using insulating ceramic with smaller heat capacity, they can be rapidly heated by conducting a current through the embedded electric heating portion 30, resulting in decreased power consumption.

Although FIG. 5 shows an example where the electric heating portion 30 is embedded in at least a part of the outer cylinder 10 and the fins 20, the electric heating portion 30 may be embedded only in at least a part of the outer cylinder 10 or the fins 20 (that is, the electric heating portion 30 may not be embedded in either the outer cylinder 10 or the fins 20).

Figure 6:
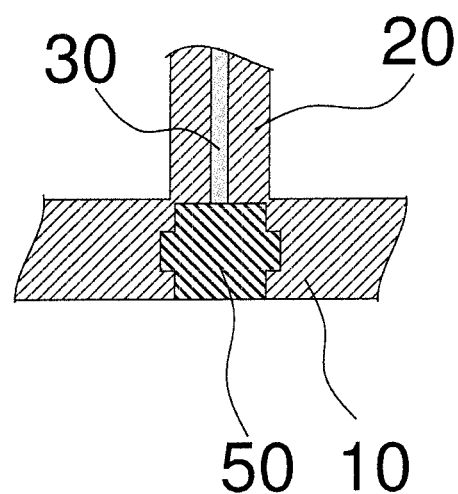
FIG. 6 is an example where an electric heating portion is embedded in at least a part of fins to further provide a drawer portion in the partially enlarged cross-sectional view of FIG. 5.

When the electric heating portion 30 is embedded only in at least a part of the fins 20, it may be provided with a drawer portion 50 that is embedded in the outer cylinder 10 and connected to the electric heating portion 30, as shown in FIG. 6. Such a structure can allow the electric heating portion 30 embedded only in at least a part of the fins 20 to be electrically connected to the outside by the drawer portion 50. Moreover, even if the electric heating portion 30 is embedded in at least a part of the outer cylinder 10 and the fins 20, or the electric heating portion 30 is embedded only in at least a part of the outer cylinder 10, the drawer portion 50 may be provided and electrically connected to the outside by the drawer portion 50.

Although the drawer portion 50 is not particularly limited, it is preferable to configure the drawer portion 50 in such a way that its resistance is sufficiently lower than that of the electric heating portion 30 in order to prevent the drawer portion from being heated. For example, the drawer portion 50 may be formed of the same material as that of the electric heating portion 30. It is preferable to increase the width and thickness of the drawer portion 50 as compared with the electric heating portion 30 in order to decrease the resistance.

Furthermore, when the electric heating portion 30 is embedded only in at least a part of the outer cylinder 10, the heat of the outer cylinder 10 heated by conducting a current through the electric heating portion 30 is also transferred to the fins 20, so that both the outer cylinder 10 and the fins 20 can be heated.

The electric heating portion 30 is formed of a material that generates heat by conducting a current. Specifically, the electric heating portion 30 can be formed of known materials such as a Ni—Cr alloy, a Fe—Cr—Al alloy, a W alloy, a Mo alloy, and a cermet containing W or Mo.

The shape of the electric heating portion 30 is not particularly limited and can be various shapes such as wire, plate, sheet, and the like.

Each of the outer cylinder 10 and fins 20 in which the electric heating portion 30 is at least partly embedded has a thickness of preferably from 0.5 to 10 mm, and more preferably from 1 to 10 mm, although not particularly limited thereto. The thickness of each of the outer cylinder 10 and fins 20 of 0.5 mm or more can allow the durability of the outer cylinder 10 and fins 20 to be ensured. Moreover, the thickness of the outer cylinder 10 and the fins 20 of 10 mm or less can allow the weight of the mixing apparatus 1A, 1B to be reduced.

The mixing apparatus 1A, 1B may further include an electrical connection terminal provided on an outer peripheral surface of the outer cylinder 10.

Figure 7:
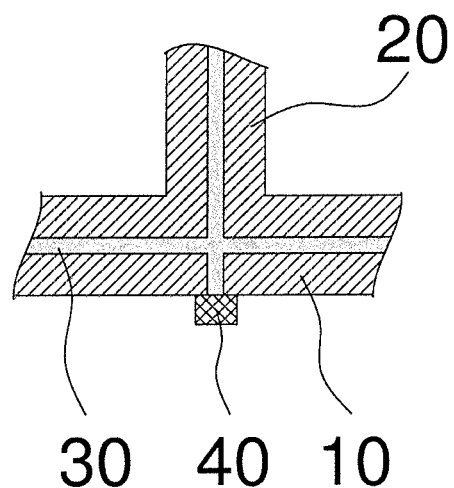
FIG. 7 is an example where an electric connection terminal is further provided in the partially enlarged cross-sectional view of FIG. 5.

FIG. 7 shows an example where the electric connection terminal is further provided in the partially enlarged cross-sectional view of FIG. 5. As shown in FIG. 7, the electrical connection terminal 40 is provided on the outer peripheral surface of the outer cylinder 10, and is connected to an end portion (a portion exposed on the outer peripheral surface of the outer cylinder 10) of the electric heating portion 30. Such a structure facilitates the connection to an external power supply.

Figure 8:
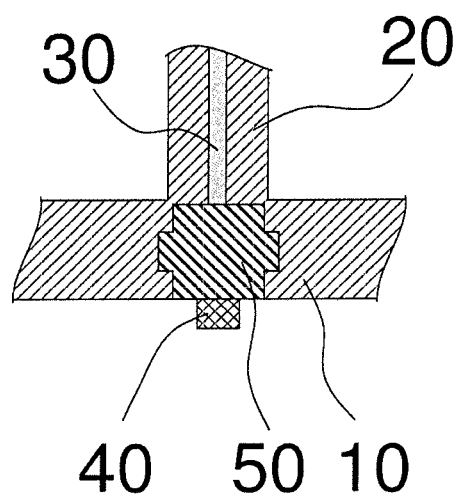
FIG. 8 is an example where an electric connection terminal is further provided in the partially enlarged sectional view of FIG. 6.

FIG. 8 shows an example where the electric connection terminal is further provided in the partially enlarged cross-sectional view of FIG. 6. As shown in FIG. 8, in the case of having the drawer portion 50 embedded in the outer cylinder 10, the electrical connection terminal 40 is connected to the drawer portion 50 (the portion exposed to the outer periphery surface of the outer cylinder 10). Such a structure facilitates the connection to an external power supply.

Preferably, the electric heating portion 30 is configured to have different heat generation densities in at least two areas. When there are areas where the surface temperature easily decrease and areas where the surface temperature hardly decreases depending on materials of the fins 20, that configuration can allow a difference between the surface temperatures of those areas to be decreased. That is, the electric heating portion 30 is configured such that the heat generation density in the areas where the surface temperature easily decreases is higher and the heat generation density in the areas where the surface temperature hardly decreases is lower, so that the difference between the surface temperatures of the areas where the surface temperature easily decreases and the areas where the surface temperature hardly decreases can be reduced.

Figure 9:
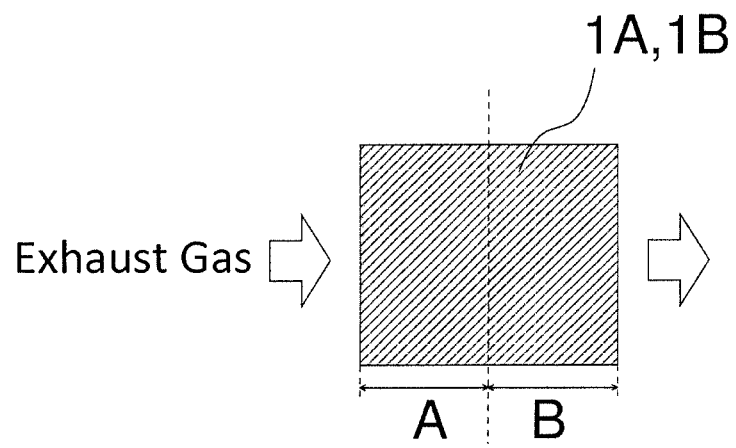
FIG. 9 is a schematic view for explaining areas A and B of an exhaust gas mixing apparatus.

For example, when the outer cylinder 10 and fins 20 of the mixing apparatus 1A, 1B are formed of dense corderite or the like, which has a lower thermal conductivity among insulating ceramics, the surface temperature of an area A located on the upstream side of the flow of the exhaust gas flowing through the mixing apparatus 1A, 1B tends to decreases as compared with that of an area B located on the downstream side. As used herein, "an area A on the upstream side" and "an area B on the downstream side" of the flow of the exhaust gas flowing through the mixing apparatus 1A, 1B mean the area A on the upstream side and the area B on the downstream side when the length of the mixing apparatus 1A, 1B in the exhaust gas flow direction is divided into two equal parts, respectively, as shown in FIG. 9.

In this case, an increase in an amount of power supplied to the area A is required for increasing the surface temperature of the area A to a certain temperature. However, if the amount of power supplied to area A is increased, the surface temperature of the area B may become unnecessarily higher, and unnecessary power consumption may increase.

Therefore, it is preferable that the electric heating portion 30 is configured such that the heat generation density of the area A located on the upstream side of the flow of the exhaust gas flowing through the mixing apparatus 1A, 1B is higher than that of the area B located on the downstream side. Such a configuration can lead to more easy heat generation in the area A than in the area B at a predetermined amount of power, so that the difference between the surface temperatures of the area A and the area B can be decreased and unnecessary power consumption can be reduced.

Furthermore, when urea is injected directly into mixing apparatus 1A, 1B, a surface temperature of an area where injected urea droplets are contacted is decreased due to endothermic reaction, so that the surface temperature of that area tends to be lower than that of an area where the injected urea droplets are not contacted. In this case, an increase in an amount of electric power supplied to the area where the injected urea droplets are contacted is required for increasing the surface temperature of the area where the injected urea droplets are contacted to a predetermined temperature. However, if the amount of electric power supplied to the area where the injected urea droplets are contacted is increased, the surface temperature of the area where the injected urea droplets are not contacted may be unnecessarily higher, resulting in an increase in unnecessary power consumption.

Therefore, the electric heating portion 30 is preferably configured such that the heat generation density of the area where the injected urea droplets are contacted is higher than that of the area where the injected urea droplets are not contacted. Such a configuration can lead to more easy heat generation in the area where the injected urea droplets are contacted than in the area where the injected urea droplets are not contacted at a predetermined amount of power, so that the difference between the surface temperatures of the area where the injected urea droplets are contacted and the area where the injected urea droplets are not contacted can be decreased and unnecessary power consumption can be reduced.

It is preferable that the electric heating portion 30 has a wiring structure, and the heat generation density is controlled by adjusting electrical resistance of the wiring according to one or more conditions selected from a wiring material, a wiring length, a wiring thickness, and a wiring width. Such a configuration can lead to easy control of the heat generation density of the electric heating portion 30.

Here, an example of the wiring structure of the electric heating portion 30 is shown in FIGS. 10 to 15. Each of FIGS. 10 to 15 is an enlarged cross-sectional view of an exhaust gas mixing apparatus, which is parallel to a flow direction of the exhaust gas. For ease of understanding, these figures show a case where the fins 20 are formed so as to be parallel to the flow direction of the exhaust gas.

Figure 10:
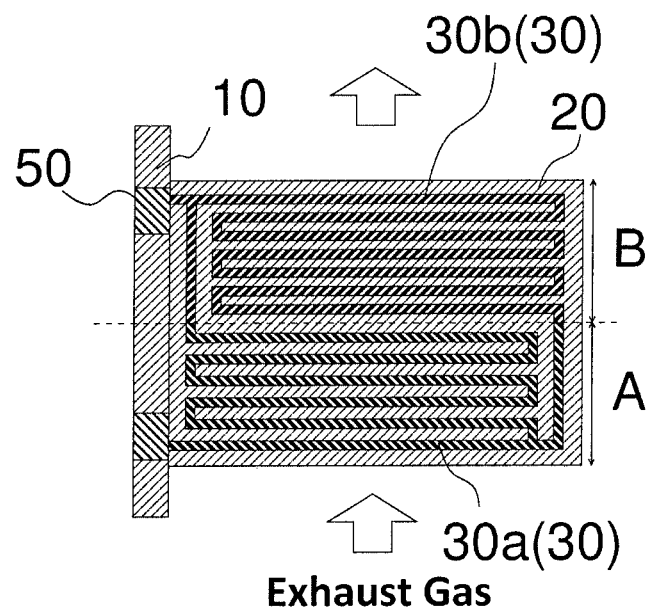
FIG. 10 is a partially enlarged view of a cross section of an exhaust gas mixing apparatus, which is parallel to a flow direction of an exhaust gas.

The electric heating portion 30 shown in FIG. 10 has a wiring structure in which an area A and an area B are electrically arranged in parallel. In this wiring structure, electric resistance of a wiring 30a of the area A is controlled so as to be lower than that of a wiring 30b of the area B by using, for the wiring 30a of the area A (the electric heating portion 30), a wiring material with lower electric resistance than that of a wiring material used for the wiring 30b of the area B (the electric heating portion 30). Such a configuration can lead to more easy heat generation in the area A than in the area B at a predetermined amount of power, so that the difference between the surface temperatures of the area A and the area B can be decreased and unnecessary power consumption can be reduced.

It should be noted that even if the wiring materials used for the wiring 30a of the area A and the wiring 30b of the area B are the same in the wiring structure of the electric heating portion 30 as shown in FIG. 10, the electric resistance of the wiring 30a of the area A can be made lower than that of the wiring 30b of the area B by making the wiring thickness and/or the wiring width of the wiring 30a of the area A lower than the wiring thickness and/or the wiring width of the wiring 30b of the area B.

Figure 11:
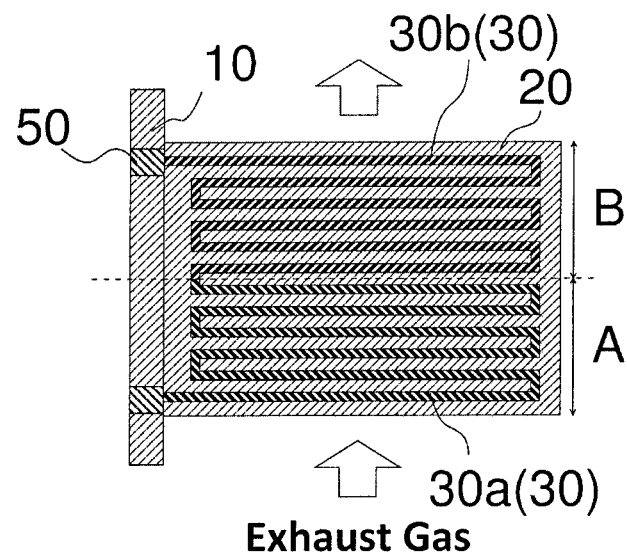
FIG. 11 is a partially enlarged view of a cross section of an exhaust gas mixing apparatus, which is parallel to a flow direction of an exhaust gas.

The electric heating portion 30 shown in FIG. 11 has a wiring structure in which an area A and an area B are electrically arranged in series. In this wiring structure, electric resistance of the wiring 30a of the area A is controlled so as to be higher than that of the wiring 30b of the area B by using, for the wiring 30a of the area A (the electric heating portion 30), a wiring material with higher electric resistance than that of a wiring material used for the wiring 30b of the area B (the electric heating portion 30). Such a configuration can lead to more easy heat generation in the area A than in the area B at a predetermined amount of power, so that the difference between the surface temperatures of the area A and the area B can be decreased and unnecessary power consumption can be reduced.

It should be noted that even if the wiring materials used for the wiring 30a of the area A and the wiring 30b of the area B are the same in the wiring structure of the electric heating portion 30 as shown in FIG. 11, the electric resistance of the wiring 30a of the area A can be made higher than that of the wiring 30b of the area B by making the wiring thickness and/or the wiring width of the wiring 30a of the area A higher than the wiring thickness and/or the wiring width of the wiring 30b of the area B.

Figure 12:
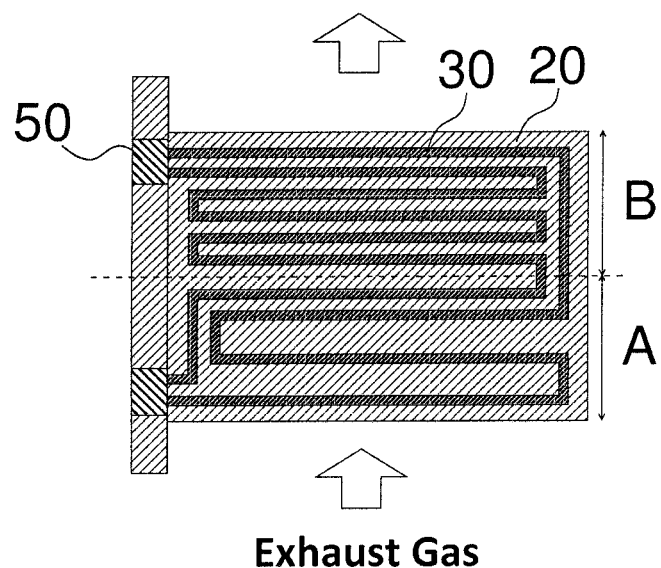
FIG. 12 is a partially enlarged view of a cross section of an exhaust gas mixing apparatus, which is parallel to a flow direction of an exhaust gas.

The electric heating portion 30 as shown in FIG. 12 has a wiring structure in which an area A and an area B are electrically arranged in parallel. In this parallel wiring structure, the wiring in the area A is more roughly arranged than the wiring in the area B. Such a configuration can lead to more easy heat generation in the area A than in the area B at a predetermined amount of power, so that the difference between the surface temperatures of the area A and the area B can be decreased and unnecessary power consumption can be reduced.

Figure 13:
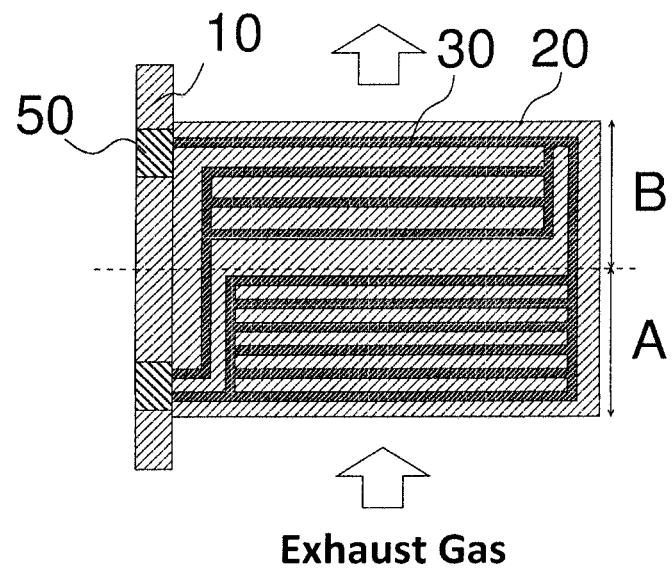
FIG. 13 is a partially enlarged view of a cross section of an exhaust gas mixing apparatus, which is parallel to a flow direction of an exhaust gas.

The electric heating portion 30 as shown in FIG. 13 has a wiring structure in which an area A and an area B are electrically arranged in parallel. In this wiring structure, the wiring in the area A and the wiring in the area B are arranged in parallel, and the wiring in the area A is more densely arranged than the wiring in the area B. Such a configuration can lead to more easy heat generation in the area A than in the area B at a predetermined amount of power, so that the difference between the surface temperatures of the area A and the area B can be decreased and unnecessary power consumption can be reduced.

Figure 14:
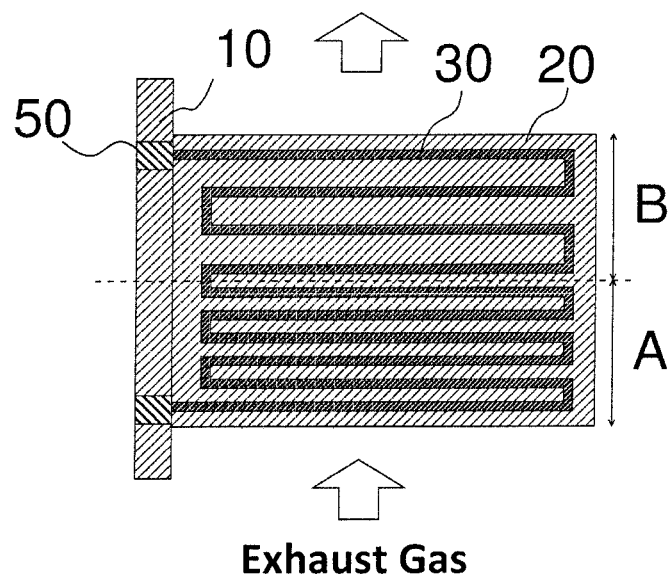
FIG. 14 is a partially enlarged view of a cross section of an exhaust gas mixing apparatus, which is parallel to a flow direction of an exhaust gas.

The electric heating portion 30 as shown in FIG. 14 has a wiring structure in which an area A and an area B are electrically arranged in series. In this wiring structure, the wiring in the area A and the wiring in the area B are arranged in series, and the wiring in the area A is more densely arranged than the wiring in the area B. Such a configuration can lead to more easy heat generation in the area A than in the area B at a predetermined amount of power, so that the difference between the surface temperatures of the area A and the area B can be decreased and unnecessary power consumption can be reduced.

Figure 15:
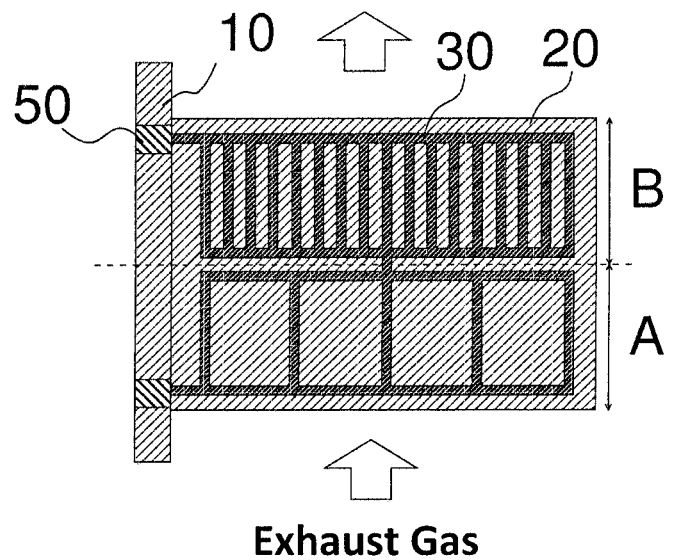
FIG. 15 is a partially enlarged view of a cross section of an exhaust gas mixing apparatus, which is parallel to a flow direction of an exhaust gas.

The electric heating portion 30 as shown in FIG. 15 has a wiring structure in which an area A and an area B are electrically arranged in series. In this wiring structure, the wiring in the area A and the wiring in the area B are arranged in parallel, and the wiring in the area A is more roughly arranged than the wiring in the area B. Such a configuration can lead to more easy heat generation in the area A than in the area B at a predetermined amount of power, so that the difference between the surface temperatures of the area A and the area B can be decreased and unnecessary power consumption can be reduced.

Figure 16:
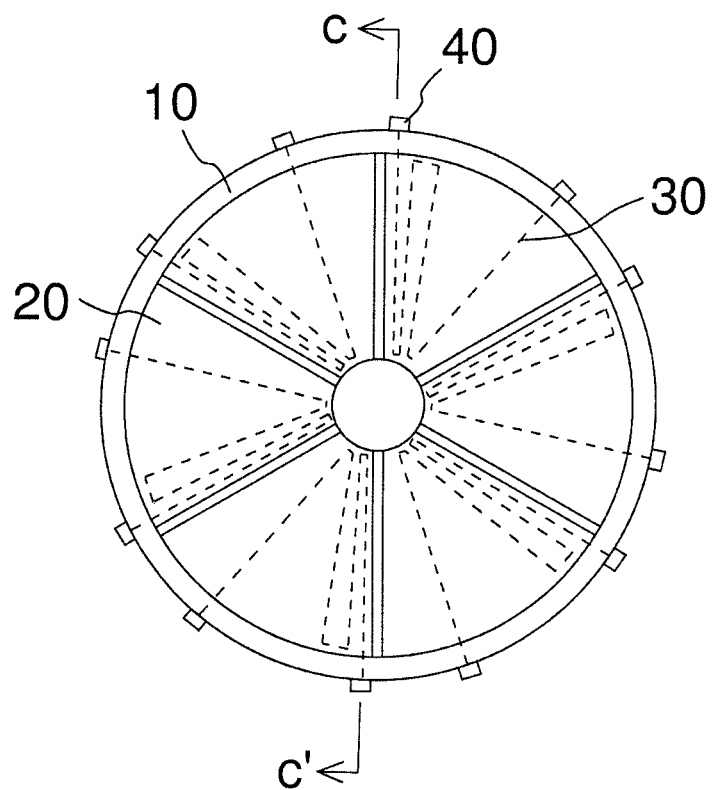
FIG. 16 is a front view of an exhaust gas mixing apparatus according to other embodiment of the present invention, as viewed from an exhaust gas inflow side.
Figure 17:
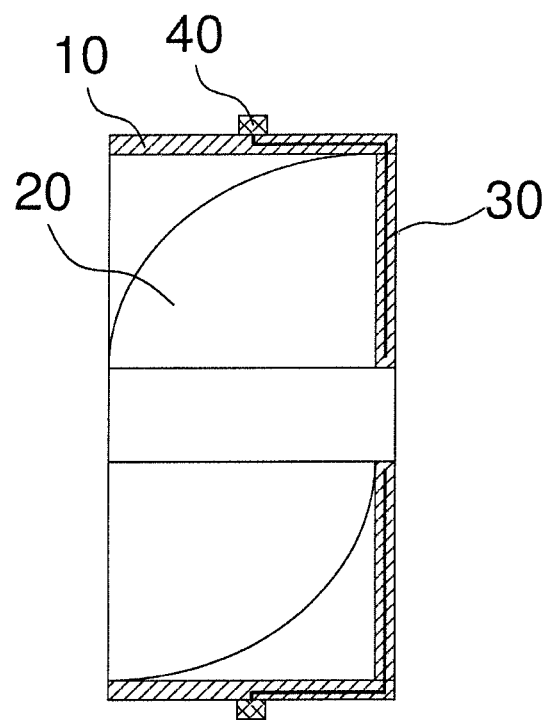
FIG. 17 is a sectional view taken along the line c-c' in FIG. 16.

FIGS. 16 and 17 each shows an example of the wiring structure of the electric heating portion 30 in the exhaust gas mixing apparatus according to an embodiment of the present invention. FIG. 16 is a front view of the exhaust gas mixing apparatus, as viewed from the exhaust gas inflow side, in which the wiring structure of the electric heating portion 30 is shown as dotted lines. Further, FIG. 17 is a cross-sectional view of the C-C' line in FIG. 16. Such a structure can lead to more easy heat generation in the area on the exhaust gas inflow side than in the area on the exhaust gas outflow side at a predetermined amount of power, so that the difference between the surface temperatures of the area on the exhaust gas inflow side and the area on the exhaust gas outflow side can be decreased and unnecessary wasteful power consumption can be reduced.

The mixing apparatus 1A, 1B having the structure as described above can be produced according to a method known in the art. For example, it can be produced by embedding the electric heating portion 30 during forming of the outer cylinder 10 and the fins 20, and then firing it.

Non-limiting examples of the forming that can be used include powder pressurized molding, casting, injection molding, tape forming, and a molding method for solidifying a slurry as described in Japanese Patent No. 4536943 B, and the like.

In the powder pressurized molding, ceramic raw material powder is placed in a mold having a predetermined shape and pressurized, on which the electric heating element 30 is placed, and the ceramic raw material powder is then further placed in the mold and pressurized, whereby the electric heating portion 30 can be embedded in a molded body.

In the tape forming, a slurry containing a ceramic raw material is formed into a tape shape, and the electric heating portion 30 is printed on a part of the molded body, and materials thus obtained are laminated.

In the molding method for solidifying the slurry, the electric heating portion 30 can be embedded in a molded body by placing the electric heating portion 30 in a mold and then solidifying a slurry containing a ceramic raw material. Alternatively, the electric heating portion 30 can be embedded in the molded body by forming the electric heating portion 30 on the molded body, then covering the electric heating portion 30 with the slurry containing the ceramic raw material and solidifying it. Alternatively, the electric heating portion 30 can be embedded in the molded body by placing a wax member of a shape corresponding to the electric heating portion 30 in a mold, and pouring the slurry containing ceramic raw materials into the mold to solidify it, and melting the wax member and removing it to obtain a molded body having a hollow portion, and then injecting a slurry or paste containing the material of the electric heating portion 30 into the hollow portion to solidify it.

The firing conditions are not particularly limited and can be adjusted according to the ceramic materials to be used.

The mixing apparatus 1A, 1B produced as described above can be rapidly heated by conducting a current through the electric heating portion 30 and have decreased power consumption, because the outer cylinder 10 and the fins 20 are formed of insulating ceramics with lower heat capacity. Therefore, when the exhaust gas temperature is lower, a current can be conducted through the electric heating portion 30 to heat the mixing apparatus 1A, 1B rapidly, so that the decomposition reaction of urea can be efficiently advanced. Moreover, since the electric heating portion 30 is embedded in the outer cylinder 10 and the fins 20, they are difficult to be rusted because urea does not adhere to them, so that their performance can be maintained for a long period of time.

(Exhaust Gas Purifier)

Figure 18:
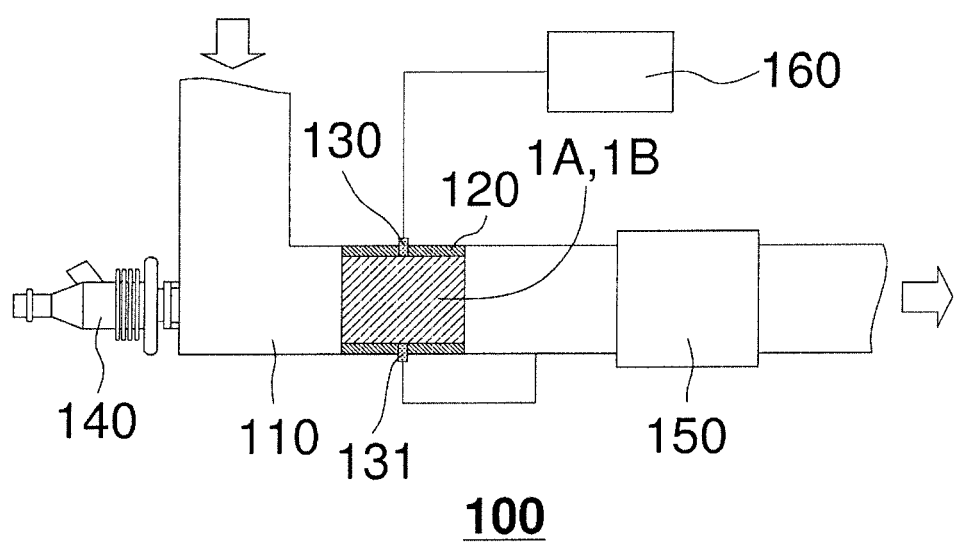
FIG. 18 is a cross-sectional view of an exhaust gas purifier according to an embodiment of the present invention.

FIG. 18 is a cross-sectional view of an exhaust gas purifier according to an embodiment of the present invention.

As shown in FIG. 18, an exhaust gas purifier 100 includes: an exhaust cylinder 110; an exhaust gas mixing apparatus 1A, 1B; a compressive elastic member 120; a first connector member 130; a second connector member 131; a urea injection nozzle 140; and an SCR catalyst 150.

The exhaust cylinder 110 is a pipe through which an exhaust gas (an exhaust gas containing NOx) discharged from various engines or the like can flow. The size of the exhaust cylinder 110 is not particularly limited and can be determined according to the type of exhaust systems such as engines.

It is preferable that the exhaust gas mixing apparatus 1A, 1B is disposed in the exhaust cylinder 110 downstream of the urea injection nozzle 140 and upstream of the SCR catalyst 150.

It should be noted that although in FIG. 18 one exhaust gas mixing apparatus 1A, 1B is arranged in the exhaust cylinder 110, two or more exhaust gas mixing apparatuses 1A, 1B may be arranged.

The compressive elastic member 120 is provided between the exhaust cylinder 110 and the exhaust gas mixing apparatus 1A, 1B. The compressive elastic member 120 has cushioning properties. By placing it in a compressed state, the exhaust gas mixing apparatus 1A, 1B can be holed in the exhaust cylinder 110 at a predetermined position.

The compressive elastic member 120 may preferably be a ceramic fiber mat, although not particularly limited thereto. As used herein, the term "ceramic fiber mat" means a mat formed of ceramic fibers.

The ceramic fiber mats may preferably be those mainly based on ceramic fibers being configured to alumina, mullite, silicon carbide, silicon nitride, zirconia, titania, or a composite thereof. Among them, it is more preferable to use a non-expandable mat mainly based on alumina or mullite.

The first connector member 130 is configured to be connected to an external power supply 160, and is electrically insulated from the exhaust cylinder 110. The first connector member 130 and the external power supply 160 are generally connected to each other via an electric wire or the like. The first connector member 130 is also electrically connected to the electric heating portion 30 of the exhaust gas mixing apparatus 1A, 1B. By providing the first connector member 130, any leakage of electric current can be suppressed. It is more preferable that the first connector member 130 is connected to an electric connection terminal 40 of the exhaust gas mixing apparatus 1A, 1B.

The second connector member 131 is configured to be grounded on the exhaust cylinder 110. The connection between the second connector member 131 and the exhaust cylinder 110 is generally made via an electric wire or the like. The second connector member 131 is also electrically connected to the electric heating portion 30 of the exhaust gas mixing apparatus 1A, 1B. By providing the second connector member 131, any electric shock due to electric leakage can be suppressed.

The urea injection nozzle 140 is a component being configured to inject urea into the exhaust cylinder 110. The urea injection nozzle 140 is connected to a tank (not shown) or the like which contains the urea, and injects the urea into the exhaust gas mixing apparatus 1A, 1B in the exhaust cylinder 110.

The urea injection nozzle 140 is not particularly limited, and any nozzle known in the art can be used.

The SCR catalyst 150 is disposed in the exhaust cylinder 110 downstream of the urea injection position. Preferably, the SCR catalyst 150 is in the form of a catalyst body (a honeycomb structure on which the SCR catalyst 150 is supported).

Examples of SCR catalyst 150 include vanadium-based catalysts, zeolite-based catalysts, and the like.

When the SCR catalyst 150 is used as a catalyst body supported on a honeycomb structure, it is preferable to store the catalyst body in a container and attach it to the container.

The honeycomb structure supporting the SCR catalyst 150 is not particularly limited and can be any honeycomb structure known in the art.

In FIG. 18, one urea injection nozzle 140 and one SCR catalyst 150 are arranged in the exhaust cylinder 110, but two or more urea injection nozzles 140 and two or more SCR catalysts 150 may be arranged, respectively. For example, when two or more exhaust gas mixing apparatuses 1A, 1B are arranged in the exhaust cylinder 110, it is preferable to have two or more urea injection nozzles 140 and two or more SCR catalysts 150, respectively. In this case, the mixing apparatuses 1A, 1B are located in the exhaust cylinder 110 between one urea injection nozzle 140 and one SCR catalyst 150 (downstream of one urea injection nozzle 140 and upstream of one SCR catalyst 150). For example, when two exhaust gas mixing apparatuses 1A, 1B are arranged in the exhaust cylinder 110, the first exhaust gas mixing apparatus 1A, 1B is arranged in the exhaust cylinder 110 downstream of the first urea injection nozzle 140 and upstream of the first SCR catalyst 150, and the second exhaust gas mixing apparatus 1A, 1B is arranged in the exhaust cylinder 110 downstream of the second urea injection nozzle 140 and upstream of the second SCR catalyst 150.

The exhaust cylinder 110 upstream of the urea injection nozzle 140 may be provided with a filter for collecting particulate matters in the exhaust gas. Examples of the filter for collecting particulate matters include a ceramic honeycomb-shaped diesel particulate filter (DPF).

The exhaust cylinder 110 upstream of the urea injection nozzle 140 may also be provided with an oxidation catalyst for removing hydrocarbons and carbon monoxide in the exhaust gas. The oxidation catalyst is used in a state where it is supported on a honeycomb structure being configured to a ceramic (oxidation catalyst body). Examples of the oxidation catalyst that can be suitably used include precious metals such as platinum (Pt), palladium (Pd), and rhodium (Rh).

The exhaust cylinder 110 downstream of the SCR catalyst 150 may be provided with an ammonia removal catalyst (oxidation catalyst) for removing $NH_3$. Such a configuration can prevents excess $NH_3$ which has not been used to remove NOx in the exhaust gas, from being discharged to the outside when the excess $NH_3$ flows downstream. Examples of the ammonia removal catalyst that can be suitably used include precious metals such as platinum (Pt), palladium (Pd), and rhodium (Rh).

An exhaust gas purification method using the above exhaust gas purifier 100 is carried out by injecting urea into the fins 20 without conducting a current through the electric heating portion 30 of the exhaust gas mixing apparatus 1A, 1B when the exhaust gas temperature is higher than a predetermined value, and injecting urea into the fins 20 while conducting a current through the electric heating portion 30 of the exhaust gas mixing apparatus 1A, 1B when the exhaust gas temperature is lower than a predetermined value.

As used herein, the predetermined value of the exhaust gas temperature means a temperature at which a sufficient amount of decomposition of the injected urea into ammonia take places by the exhaust gas.

When the exhaust gas temperature is higher than the predetermined value, the urea injected from the urea injection nozzle 140 into the exhaust gas mixing apparatus 1A, 1B collides with the fins 20 of the exhaust gas mixing apparatus 1A, 1B to be scattered around them, dispersed in the exhaust gas and decomposed into $NH_3$.

On the other hand, when the exhaust gas temperature is lower than the predetermined value, a current is conducted from the external power supply 160 to the electric heating portion 30 to rapidly heat the outer cylinder 10 and the fins 20 of the exhaust gas mixing apparatus 1A, 1B, so that the urea in contact with them is decomposed into $NH_3$ and dispersed in the exhaust gas. The $NH_3$ dispersed in the exhaust gas is used as a reducing agent in the SCR catalyst 150 to reduce the NOx in the exhaust gas into water and nitrogen for purification.

The exhaust gas purifier 100 uses the exhaust gas mixing apparatus 1A, 1B, which are rust-resistant and can be efficiently heated with less power, so that even if the exhaust gas temperature is lower, good NOx purification performance can be obtained over a long period of time with less power.

EXAMPLES

Hereinafter, the present invention will be more specifically described by means of Examples. However, the present invention is not limited in any way by these Examples.

Example 1

Figure 19:
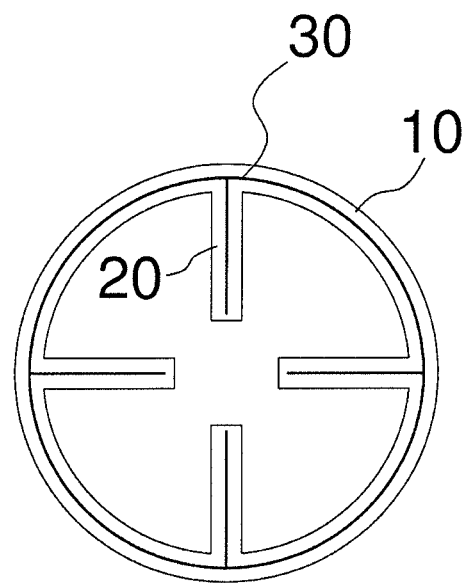
FIG. 19 is a front view of an exhaust gas mixing apparatus according to Example 1, as viewed from an exhaust gas inflow side.

Four fins each having a length of 40 mm (a length parallel to the axial direction of the outer cylinder 10), a height of 20 mm (a length in the radial direction of the outer cylinder 10), and a thickness of 1 mm were disposed at 90° intervals on an inner side of the cylindrical outer cylinder 10 having a length of 40 mm, an outer diameter of 60 mm, and a thickness of 1 mm, and an electric heating portion 30 having a thickness of 0.1 mm was embedded at a center of the outer cylinder 10 and the four fins 20 in the thickness direction to produce an exhaust gas mixing apparatus. FIG. 19 shows a front view of the exhaust gas mixing apparatus as viewed from the exhaust gas inflow side. In FIG. 19, for ease of understanding, the embedded electric heating portion is also shown. The outer cylinder 10 and the fins 20 were configured to silicon nitride.

Comparative Example 1

Figure 20:
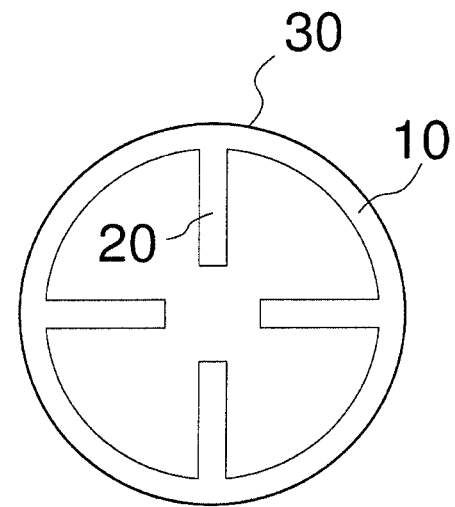
FIG. 20 is a front view of an exhaust gas mixing apparatus according to Comparative Example 1, as viewed from an exhaust gas inflow side.

Four each fins having a length of 40 mm (a length parallel to the axial direction of the outer cylinder 10), a height of 20 mm (a length in the radial direction of the outer cylinder 10), and a thickness of 1 mm were disposed at 90° intervals on an inner side of the cylindrical outer cylinder 10 having a length of 40 mm, an outer diameter of 60 mm, and a thickness of 1 mm, and an electric heating portion 30 having a thickness of 0.1 mm was provided in the outer peripheral portion to produce an exhaust gas mixing apparatus. FIG. 20 shows a front view of the exhaust gas mixing apparatus as viewed from the exhaust gas inflow side. The outer cylinder 10 and the fins 20 were configured to SUS430.

Heating simulations were carried out on the above exhaust gas mixing apparatuses according to Example 1 and Comparative Example 1. As software used for carrying out the heating simulations, Ansys fluent Ver19.1 was used. The simulation conditions were solver type: pressure-based solver; and turbulence model: low Reynolds type SST (Shear Stress Transform) k-ω. In the heating simulations, the density of silicon nitride was set to 3.2 g/cm$^3$, the heat capacity to 700 J/kgK, and the thermal conductivity to 60 W/mK, while the density of SUS430 was set to 7.7 g/cm$^3$, the heat capacity to 460 J/kgK, and the thermal conductivity to 26 W/mK.

In the heating simulations, when 300 W was applied, the surface temperatures of the gas flow portions were compared when a gas at 27° C. entered the exhaust gas mixing apparatus at a flow rate of 2 Nm$^3$/min. The minimum temperature on the surface of the gas flow portion was 254°

Figure 21:
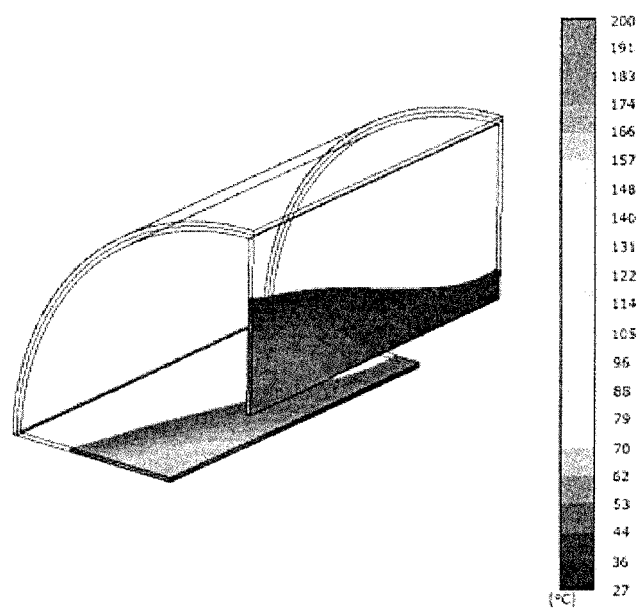
FIG. 21 is a view showing a heating simulation result of an exhaust gas mixing apparatus according to Comparative Example 1.

C. for Example 1, while it was lower for Comparative Example 1, which was 120° C. In Comparative Example 1, there was an area less than or equal to 200° C. in wide areas of the fins, as shown in FIG. 21 (FIG. 21 shows a temperature distribution from about 131° C. to 200° C.). Although not shown, in Example 1, the minimum temperature on the surface was 200° C. or higher, so there was no area less than or equal to 200° C.

Therefore, the exhaust gas mixing apparatus according to Example 1 can be heated with less energy than the exhaust gas mixing apparatus according to Comparative Example 1. Further, the exhaust gas mixing apparatus according to Example 1 can be easily heated to a temperature range where $NH_3$ can be produced by pyrolysis and hydrolysis of aqueous urea.

Example 2

An exhaust gas mixing apparatus was obtained in the same method as that of Example 1, with the exception that the electric heating portion was provided such that the heat generation density of the area A located on the upstream side of the flow of the exhaust gas flowing through the exhaust gas mixing apparatus was higher than that of the area B located on the downstream side, and a voltage to be applied was set such that a voltage ratio of the area A: the area B was about 2:1, and that the outer cylinder 10 and the fins 20 were configured to cordierite.

Example 3

The exhaust gas mixing apparatus was obtained in the same method as that of Example 1, with the exception that the electric heating portion having the same heat generation density of the areas A and B was provided.

Heating simulations were carried out on the above exhaust gas mixing apparatuses according to Examples 2 and 3. As software used for carrying out the heating simulations, Ansys fluent Ver19.1 was used. The simulation conditions were solver type: pressure-based solver; and turbulence model: low Reynolds type SST (Shear Stress Transform) k-ω. In the heating simulations, calculation was carried out by setting the density of cordierite to 2.5 g/cm³, the heat capacity to 630 J/kgK, and the thermal conductivity to 4.4 W/mK.

Figure 22:
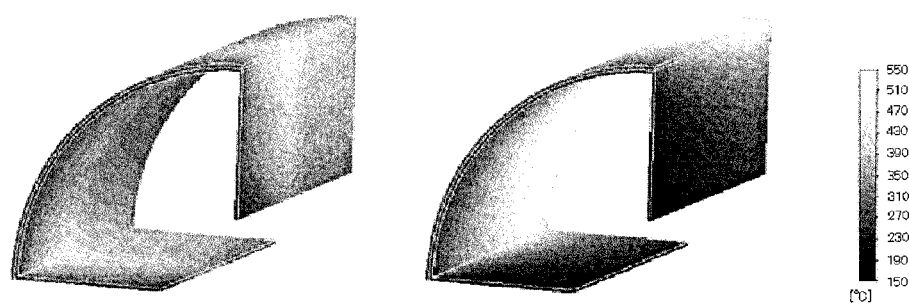
FIG. 22 is a view showing heating simulation results of exhaust gas mixing apparatuses according to Examples 2 and 3.

In the heating simulations, when 300 W was applied, the surface temperatures of the gas flow portions were compared when a gas at 27° C. entered the exhaust gas mixing apparatuses at a flow rate of 2 Nm³/min. The minimum temperatures on the surfaces of the gas flow portions in Example 2 were 202° C. for the area A and 293° C. for the area B, while the minimum temperatures the surfaces of the gas flow portions in Example 3 were 120° C. for the area A and 225° C. for the area. As shown in FIG. 22, in Example 3, the temperature was less than or equal to 200° C. in wide areas of the fins (especially in the area A), whereas in Example 2, no area less than or equal to 200° C. was found.

Therefore, the exhaust gas mixing apparatus according to Example 2 can be heated with less energy than the exhaust gas mixing apparatus according to Example 3. Further, the exhaust gas mixing apparatus according to Example 2 can be easily heated to a temperature range where $NH_3$ can be produced by pyrolysis and hydrolysis of aqueous urea.

DESCRIPTION OF REFERENCE NUMERALS 1A, 1B exhaust gas mixing apparatus
10 outer cylinder
20 fin
30 electric heating portion
40 electrical connection terminal
50 drawer portion
100 exhaust gas purifier
110 exhaust pipe.
120 compressive elastic member
130 first connector member.
131 second connector member
140 urea injection nozzle
150 SCR catalyst
160 external power supply

The invention claimed is:

1. An exhaust gas mixing apparatus comprising:
   an outer cylinder being configured of an insulating ceramic;
   fins being configured of an insulating ceramic, the fins being provided on an inner side of the outer cylinder; and
   an electric heating portion embedded in at least a part of the outer cylinder and/or the fins.

2. The exhaust gas mixing apparatus according to claim 1, wherein the outer cylinder and the fins are integrally formed.

3. The exhaust gas mixing apparatus according to claim 1, wherein the insulating ceramic used for the outer cylinder and the fins is dense.

4. The exhaust gas mixing apparatus according to claim 1, wherein the insulating ceramic used for the outer cylinder and the fins is of the same material.

5. The exhaust gas mixing apparatus according to claim 1, wherein the insulating ceramic used for the outer cylinder and the fins has a heat capacity of 4.5 J/cm³K or less.

6. The exhaust gas mixing apparatus according to claim 1, wherein the insulating ceramic used for the outer cylinder and the fins has a thermal conductivity of 30 W/mK or more.

7. The exhaust gas mixing apparatus according to claim 1, wherein the exhaust gas mixing apparatus further comprises a drawer portion embedded in the outer cylinder and connected to the electric heating portion.

8. The exhaust gas mixing apparatus according to claim 7, wherein the exhaust gas mixing apparatus further comprises an electric connection terminal provided on an outer peripheral surface of the outer cylinder and connected to an end portion of the electric heating portion or the drawer portion.

9. The exhaust gas mixing apparatus according to claim 1, wherein the electric heating portion is configured to have different heat generation densities in at least two areas.

10. The exhaust gas mixing apparatus according to claim 9, wherein the electric heating portion is configured such that heat generation density in an area where injected urea droplets are contacted is higher than that in an area where injected urea droplets are not contacted.

11. The exhaust gas mixing apparatus according to claim 9, wherein the electric heating portion has a wiring structure, and wherein the heat generation density is controlled by adjusting electrical resistance of a wiring according to one or more conditions selected from a wiring material, a wiring length, a wiring thickness, and a wiring width.

12. The exhaust gas mixing apparatus according to claim 9, wherein the electric heating portion is configured such that heat generation density of an area A disposed on an upstream side of a flow of an exhaust gas flowing through the exhaust gas mixing apparatus is higher than that of an area B disposed a downstream side.

13. The exhaust gas mixing apparatus according to claim 12, wherein the electric heating portion has a wiring structure in which the area A and the area B are electrically arranged in parallel, and wherein the electric resistance of the wiring in the area A is lower than that of the wiring in the area B.

14. The exhaust gas mixing apparatus according to claim 12, wherein the electric heating portion has a wiring structure in which the area A and the area B are electrically arranged in series, and wherein the electrical resistance of the wiring in the area A is higher than that of the wiring in the area B.

15. The exhaust gas mixing apparatus according to claim 12, wherein the electric heating portion has a wiring structure in which the area A and the area B are electrically arranged in parallel, and wherein the wiring in the area A is more roughly arranged than the wiring in the area B.

16. The exhaust gas mixing apparatus according to claim 12, wherein the electric heating portion has a wiring structure in which the area A and the area B are electrically arranged in parallel, and wherein the wiring in the area A and the wiring in the area B are arranged in parallel, respectively, and wherein the wiring in the area A is more densely arranged than the wiring in the area B.

17. The exhaust gas mixing apparatus according to claim 12, wherein the electric heating portion has a wiring structure in which the area A and the area B are electrically arranged in series, and wherein the wiring in the area A and the wiring in the area B are arranged in series, respectively, and wherein the wiring in the area A is more densely arranged than the wiring in the area B.

18. The exhaust gas mixing apparatus according to claim 12, wherein the electric heating portion has a wiring structure in which the area A and the area B are electrically arranged in series, and wherein the wiring in the area A and the wiring in the area B are arranged in parallel, respectively, and wherein the wiring in the area A is more roughly arranged than the wiring in the area B.

19. An exhaust gas purifier, comprising:
   an exhaust cylinder through which an exhaust gas can flow;
   the exhaust gas mixing apparatus according to claim 1, the exhaust gas mixing apparatus being disposed within the exhaust cylinder; and
   a compressive elastic member provided between the exhaust cylinder and the exhaust gas mixing apparatus.

20. The exhaust gas purifier according to claim 19, wherein the compressive elastic member is a ceramic fiber mat.

21. The exhaust gas purifier according to claim 19, further comprising:
   one or more urea injection nozzles being configured to inject urea into the exhaust cylinder; and
   one or more SCR catalysts arranged in the exhaust cylinder downstream of a position where the urea is injected;
   wherein the exhaust gas mixing apparatus is located in the exhaust cylinder downstream of the urea injection nozzles and upstream of the SCR catalysts.

22. The exhaust gas purifier according to claim 19, wherein the exhaust gas purifier further comprises a first connector member, the first connector member being configured to be connected to an external power supply and electrically insulated from the exhaust cylinder, and wherein the first connector member is electrically connected to the electric heating portion of the exhaust gas mixing apparatus.

23. The exhaust gas purifier according to claim 22, wherein the exhaust gas purifier further comprises a second connector member configured to be grounded on the exhaust cylinder, and wherein the second connector member is electrically connected to the electric heating portion of the exhaust gas mixing apparatus.

24. An exhaust gas purification method using the exhaust gas purifier according to claim 19, comprising the steps of:
   injecting urea to the fins while conducting no current through the electric heating portion of the exhaust gas mixing apparatus when a temperature of an exhaust gas is higher than or equal to a predetermined value; and
   injecting the urea to the fins while conducting a current through the electric heating portion when the temperature of the exhaust gas is lower than the predetermined value.

* * * * *